US009066216B2

(12) United States Patent
Jacobstein et al.

(10) Patent No.: US 9,066,216 B2
(45) Date of Patent: Jun. 23, 2015

(54) METHODS AND APPARATUS FOR PROVIDING MESSAGING USING VOICEMAIL

(71) Applicant: Qualcomm Connected Experiences, Inc., San Diego, CA (US)

(72) Inventors: Mark Williams Jacobstein, San Francisco, CA (US); Jacob Guedalia, New York, NY (US); Isaac David Guedalia, Bet Shemesh (IL)

(73) Assignee: QUALCOMM INCORPORATED, San Diego, CA (US)

( * ) Notice: Subject to any disclaimer, the term of this patent is extended or adjusted under 35 U.S.C. 154(b) by 126 days.

(21) Appl. No.: 13/946,822

(22) Filed: Jul. 19, 2013

(65) Prior Publication Data

US 2013/0310009 A1 Nov. 21, 2013

Related U.S. Application Data

(62) Division of application No. 13/004,869, filed on Jan. 11, 2011, now Pat. No. 8,577,341.

(60) Provisional application No. 61/336,062, filed on Jan. 15, 2010, provisional application No. 61/300,101, filed on Feb. 1, 2010.

(51) Int. Cl.
*H04M 11/10* (2006.01)
*H04W 4/16* (2009.01)
(Continued)

(52) U.S. Cl.
CPC ............ *H04W 4/16* (2013.01); *H04M 3/42153* (2013.01); *H04M 3/53383* (2013.01); *H04M 7/0024* (2013.01); *H04M 2207/18* (2013.01)

(58) Field of Classification Search
CPC ..... G06Q 30/02; G06Q 10/107; G06Q 10/10; G06Q 50/01; G06Q 10/109; G06Q 40/00; G06Q 10/06; G06Q 20/10; G06Q 20/32; G06Q 20/382; G06Q 30/0601; G06Q 40/025; G06Q 30/0252; G06Q 30/0277; G06Q 30/06; G06Q 10/00; G06Q 10/101

USPC ................................ 705/319; 455/412.1–417
See application file for complete search history.

(56) References Cited

U.S. PATENT DOCUMENTS 6,122,682 A 9/2000 Andrews
6,614,887 B1 9/2003 Satapathy et al.
(Continued)

FOREIGN PATENT DOCUMENTS

CN 201355842 Y 12/2009
JP H0955792 A 2/1997
(Continued)

OTHER PUBLICATIONS

International Preliminary Report on Patentability—PCT/US2011/021327, The International Bureau of WIPO—Geneva, Switzerland—Feb. 22, 2012.
(Continued)

*Primary Examiner* — Ronald Eisner
(74) *Attorney, Agent, or Firm* — Muncy, Geissler, Olds & Lowe, P.C.

(57) ABSTRACT

Methods and apparatus for providing voicemail services to callers of wireless devices may include providing customized outgoing messages to callers based upon the caller's identification. A subscriber to the voicemail service may select one or more contacts associated with the subscriber to receive a customized outgoing message while the remaining callers receive a general outgoing message. The methods and apparatus may further include distributing voicemail messages from a subscriber's voicemail accounts to one or more social networking sites. The subscriber to the voicemail services may share one or more received voicemail messages via one or more social networking accounts associated with the subscriber.

30 Claims, 15 Drawing Sheets

(51) Int. Cl.
*H04M 3/533* (2006.01)
*H04M 7/00* (2006.01)
*H04M 3/42* (2006.01)

(56) References Cited

U.S. PATENT DOCUMENTS

| | | | |
|---|---|---|---|
| 8,249,571 B2* | 8/2012 | Jacobstein et al. | 455/416 |
| 8,577,341 B2* | 11/2013 | Jacobstein et al. | 455/413 |
| 2007/0220092 A1* | 9/2007 | Heitzeberg et al. | 709/204 |
| 2009/0138562 A1* | 5/2009 | Schmulen et al. | 709/206 |
| 2009/0154669 A1* | 6/2009 | Wood et al. | 379/88.23 |
| 2009/0164569 A1 | 6/2009 | Garcia et al. | |
| 2009/0186694 A1* | 7/2009 | Gunawardana et al. | 463/31 |
| 2009/0221280 A1 | 9/2009 | Mitelberg | |
| 2010/0216443 A1* | 8/2010 | Jacobstein et al. | 455/416 |
| 2011/0105087 A1 | 5/2011 | Toebes et al. | |
| 2011/0177796 A1* | 7/2011 | Jacobstein et al. | 455/413 |
| 2011/0182415 A1* | 7/2011 | Jacobstein et al. | 379/202.01 |
| 2013/0310009 A1* | 11/2013 | Jacobstein et al. | 455/413 |

FOREIGN PATENT DOCUMENTS

| | | |
|---|---|---|
| JP | H1013948 A | 1/1998 |
| JP | 2000232521 A | 8/2000 |
| JP | 2002199105 A | 7/2002 |
| JP | 2004056225 A | 2/2004 |
| JP | 2006285467 A | 10/2006 |
| WO | 2008005924 A2 | 1/2008 |
| WO | 2008084207 A1 | 7/2008 |

OTHER PUBLICATIONS

International Search Report and Written Opinion—PCT/US2011/021327—ISA/EPO—May 27, 2011.
European Search Report—EP13161434—Search Authority—Hague—Dec. 10, 2013.

* cited by examiner

METHODS AND APPARATUS FOR PROVIDING MESSAGING USING VOICEMAIL

CLAIM OF PRIORITY

The present application for patent is a divisional of U.S. patent application Ser. No. 13/004,869, entitled "METHODS AND APPARATUS FOR PROVIDING MESSAGING USING VOICEMAIL", filed on Jan. 11, 2011, which is assigned to the assignee hereof and expressly incorporated by reference in its entirety, which in turn claims priority to the following Provisional Applications:

Provisional Application No. 61/336,062 entitled "Method and Apparatus for Providing Dynamic Multimedia Messaging Using Voicemail" filed Jan. 15, 2010, and assigned to the assignee hereof and hereby expressly incorporated by reference herein in its entirety; and Provisional Application No. 61/300,101 entitled "Method and Apparatus for Providing Dynamic Multimedia Messaging Using Voicemail—II" filed Feb. 1, 2010, and assigned to the assignee hereof and hereby expressly incorporated by reference herein in its entirety.

BACKGROUND

In today's world, wireless communication systems are widely deployed to provide various types of content, including voice, video, music, text, and data, for example. Wireless devices, such as cellular telephones or handheld devices having wireless connection capability are deployed leveraging the wireless communication system by users for communicating and interacting with each other. Wireless device users typically have a voicemail service for the wireless device which provides outgoing messages to callers trying to reach the wireless device user and/or receive messages from callers trying to reach the wireless device user.

Accessing voicemail accounts for wireless devices, however, typically takes a long time, and uses voice minutes from the user's subscription plan with a network carrier in order to receive and listen to the voicemail messages. In addition, voicemail is typically trapped within the phone system and is difficult to share with one or more individuals at a time. Thus, there is a need in the art for methods and systems for accessing and distributing voicemail messages in an easy manner.

SUMMARY

The following presents a simplified summary of one or more aspects in order to provide a basic understanding of such aspects. This summary is not an extensive overview of all contemplated aspects, and is not intended to either identify key or critical elements of all aspects nor delineate the scope of any or all aspects. Its sole purpose is to present some concepts of one or more aspects in a simplified form as a prelude to the more detailed description that is presented later.

One aspect relates to a method of for presenting a customized outgoing message to a caller calling a wireless device. The method may include accessing, at a server, a voicemail account associated with the wireless device. The method may further include receiving a selection of one or more contacts to receive the customized outgoing message. In addition, the method may include receiving the customized outgoing message. The method may also include associating the customized outgoing message with the one or more selected contacts. The method may further include determining whether the caller is associated with the customized outgoing message. Moreover, the method may include playing the customized outgoing message to the caller if the caller is associated with the customized outgoing message.

Another aspect relates to at least one processor configured to present a customized outgoing message to a caller calling a wireless device. The processor may include a first module for accessing a voicemail account associated with the wireless device. The processor may additionally include a second module for receiving a selection of one or more contacts to receive the customized outgoing message. The processor may also include a third module for receiving the customized outgoing message. In addition, the processor may include a fourth module for associating the customized outgoing message with the one or more selected contacts. The processor may further include a fifth module for determining whether the caller is associated with the customized outgoing message. The processor may also include a sixth module for playing the customized outgoing message to the caller if the caller is associated with the customized outgoing message.

Yet another aspect relates to a computer program product. The computer program product may include a computer-readable medium including at least one instruction for causing a computer to access a voicemail account associated with the wireless device. The computer-readable medium may further include at least one instruction for causing the computer to receive a selection of one or more contacts to receive a customized outgoing message. The computer-readable medium may additionally include at least one instruction for causing the computer to receive the customized outgoing message. The computer-readable medium may also include at least one instruction for causing the computer to associate the customized outgoing message with the one or more selected contacts. Furthermore, the computer-readable medium may include at least one instruction for causing the computer to determine whether the caller is associated with the customized outgoing message. Moreover, the computer-readable medium may include at least one instruction for causing the computer to play the customized outgoing message to the caller if the caller is associated with the customized outgoing message.

Another aspect relates to an apparatus. The apparatus may include means for accessing a voicemail account associated with the wireless device. The apparatus may additionally include means for receiving a selection of one or more contacts to receive a customized outgoing message. The apparatus may include means for receiving the customized outgoing message. The apparatus may also include means for associating the customized outgoing message with the one or more selected contacts. In addition, the apparatus may include means for determining whether the caller is associated with the customized outgoing message. Further, the apparatus may include means for playing the customized outgoing message to the caller if the caller is associated with the customized outgoing message.

Still another aspect relates to an apparatus for presenting a customized outgoing message to a caller calling a wireless device. The apparatus may include a voicemail service operable to access a voicemail account associated with the wireless device, receive a selection of one or more contacts to receive the customized outgoing message and to receive the customized outgoing message, associate the customized outgoing message with the one or more selected contacts, and determine whether the caller is associated with the customized outgoing message. The apparatus may further include a player operable to play the customized outgoing message to the caller if the caller is associated with the customized outgoing message.

Another aspect relates to a method for sharing a voicemail message with one or more social networking sites. The method may include receiving, at a server, a voicemail message at a voicemail account associated with a wireless device. The method may also include retrieving the voicemail message from the voicemail account. The method may further include receiving social network information for one or more social network services associated with the voicemail account. The method may also include accessing the one or more social network services using the social network information. In addition, the method may include sharing the retrieved voicemail message with the one or more social network services.

Yet another aspect relates to at least one processor configured to share a voicemail message with one or more social networking sites. The processor may include a first module for receiving a voicemail message at a voicemail account associated with a wireless device. The processor may also include a second module for retrieving the voicemail message from the voicemail account. The processor may additionally include a third module for receiving social network information for one or more social network services associated with the voicemail account. The processor may also include a fourth module for accessing the one or more social network services using the social network information. Further, the processor may include a fifth module for sharing the retrieved voicemail message with the one or more social network services.

Another aspect relates to a computer program product. The computer program product may include a computer-readable medium including at least one instruction for causing a computer to receive a voicemail message at a voicemail account associated with a wireless device. The computer-readable medium may additionally include at least one instruction for causing a computer to retrieve the voicemail message from the voicemail account. The computer-readable medium may also include at least one instruction for causing the computer to receive social network information for one or more social network services associated with the voicemail account. Furthermore, the computer-readable medium may include at least one instruction for causing the computer to access the one or more social network services using the social network information. Moreover, the computer-readable medium may include at least one instruction for causing the computer to share the retrieved voicemail message with the one or more social network services.

Still another aspect relates to an apparatus. The apparatus may include means for receiving a voicemail message at a voicemail account associated with a wireless device. The apparatus may also include means for retrieving the voicemail message from the voicemail account. The apparatus may further include means for receiving social network information for one or more social network services associated with the voicemail account. In addition, the apparatus may include means for accessing the one or more social network services using the social network information. Furthermore, the apparatus may include means for sharing the retrieved voicemail message with the one or more social network services.

Another aspect relates to an apparatus for sharing a voicemail message with one or more social networking sites. The apparatus may include a voicemail account operable to receive a voicemail message for a wireless device, retrieve the voicemail message from the voicemail account, receive social network information for one or more social network services associated with the voicemail account, access the one or more social network services using the social network information, and share the retrieved voicemail message with the one or more social network services.

Yet another aspect relates to a method for providing a customized outgoing message to a caller calling a wireless device. The method may include providing, at the wireless device, a selection of one or more contacts to receive a customized outgoing message to a voicemail service account. The method may also include recording the customized outgoing message. The method may further include sending the recorded customized outgoing message to the voicemail service account.

Another aspect relates to at least one processor configured to provide a customized outgoing message to a caller calling a wireless device. The processor may include a first module for providing, at the wireless device, a selection of one or more contacts to receive a customized outgoing message to a voicemail service account. The processor may further include a second module for recording the customized outgoing message. In addition, the processor may include a third module for sending the recorded customized outgoing message to the voicemail service account.

Another aspect relates to a computer program product. The computer program product may include a computer-readable medium including at least one instruction for causing a computer to provide, at a wireless device, a selection of one or more contacts to receive a customized outgoing message to a voicemail service account. The computer-readable medium may additionally include at least one instruction for causing the computer to record the customized outgoing message. The computer-readable medium may also include at least one instruction for causing the computer to send the recorded customized outgoing message to the voicemail service account.

Still another aspect relates to an apparatus. The apparatus may include means for providing a selection of one or more contacts to receive a customized outgoing message to a voicemail service account. The apparatus may also include means for recording the customized outgoing message. The apparatus may further include means for sending the recorded customized outgoing message to the voicemail service account.

Another aspect relates to an apparatus for providing a customized outgoing message to a caller calling a wireless device. The apparatus may include a voicemail client operable to provide a selection of one or more contacts to receive a customized outgoing message to a voicemail service account. In addition, the apparatus may include the voicemail client operable to record the customized outgoing message. Further, the apparatus may include the voicemail client operable to send the recorded customized outgoing message to the voicemail service account.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and systems for providing voicemail services for wireless devices. The voicemail services may include providing customized outgoing messages to callers based upon the callers' identification. For example, a subscriber to the voicemail service may select one or more contacts associated with the subscriber to receive a customized outgoing message while the remaining callers receive a general outgoing message.

In addition, the described aspects relate to methods and systems for distributing voicemail messages from a subscriber's voicemail account to one or more social networking sites. In an aspect, for example, the subscriber to the voicemail services may share one or more received voicemail messages via one or more social networking accounts associated with the subscriber. The subscriber may post a link to the received voicemail message on one or more social networking sites. In another aspect, for example, the subscriber may leave an audio message on the one or more social networking sites.

Figure 1:
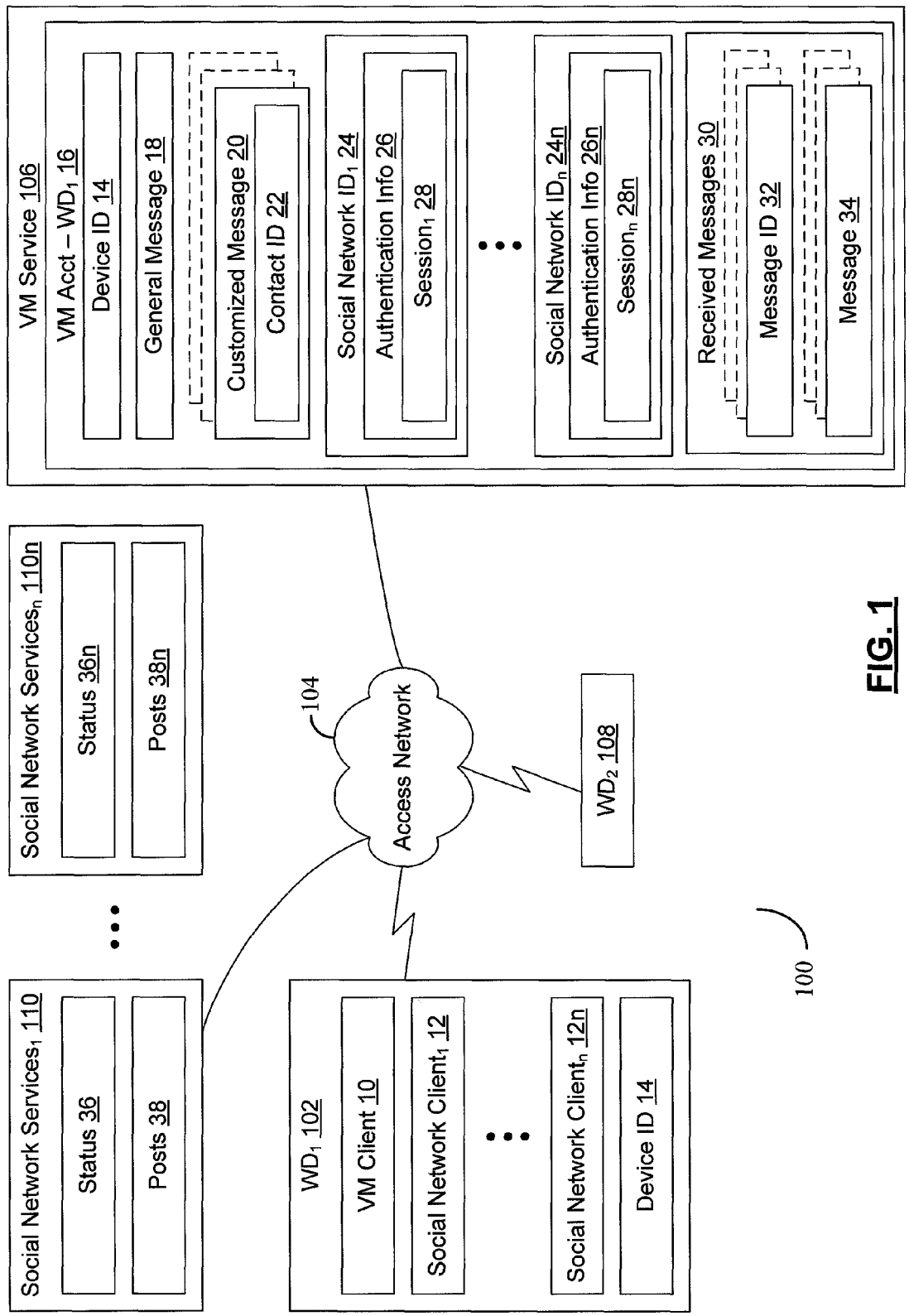
FIG. 1 is an illustration of a connectivity system in accordance with an aspect.

Referring now to FIG. 1, illustrated is an example connectivity system 100 that includes one or more wireless devices 102, 108 communicating through one or more access networks 104 with one or more servers and/or computing devices 106, according to one aspect. Wireless devices 102, 108 may include any mobile or portable computing or communications device, such as a cellular device, that may connect to an access network 104. Wireless devices 102, 108 may be, for example, a cellular telephone, a navigation system, a computing device, a camera, a PDA, a music device, a gaming device or a handheld device having wireless connection capability, among other devices. Server/computing device 106 may include any mobile or fixed computing device connected to a network. Server/computing device 106 may include, but is not limited to, a computing device, a server, a cellular telephone, a camera, a PDA, a music device, a gaming device, a navigation system, or a handheld device having wireless connection capability, among other devices.

In addition, connectivity system 100 may include one or more social network services 110 communicating through one or more access networks 104 with one or more wireless devices 102, 108 and one or more servers and/or computing devices 106. Furthermore, access network 104 may provide one or more types of communication connections, such as any type of wireless airlink, to wireless devices 102, 108, social network services 110, and server 106. Wireless devices 102, 108 may place and/or receive a communication, e.g., a telephone call, a voicemail message, a video conferencing call, an Internet Protocol session, a Voice Over Internet protocol (IP) call, a short message service (SMS) message, a multimedia messaging service (MMS) message, an instant messaging (1M) service message, a chat or net-meeting related connection, a video, music, or data transfer, among other communications, via access network 104 to and/or from one or more servers 106. In addition, wireless devices 102, 108 may receive a communication via access network 104 from one or more servers 106, or from any other device in communication with access network 104.

Wireless device 102 may include a voicemail client 10 operable for registering for voicemail services and providing voicemail services to a user of wireless device 102, e.g., a subscriber of the voicemail services. Voicemail services may include, but are not limited to, recording outgoing messages for the subscriber, receiving voicemail messages left for the subscriber, and/or customizing outgoing messages for one or more contacts associated with the subscriber. In an aspect, the outgoing messages and/or voicemail messages may include visual voicemail messages, such as a link, graphics, text, or any other form of message in addition to and/or instead of audio. Voicemail client 10 may communicate with voicemail service 106 during the registration process to create a voicemail account 16 for wireless device 102. During the registration process, voicemail client 10 may provide one or more device identifications (ID) 14 to the voicemail account 16 as well as a user name and password to create a unique voicemail account 16 associated with wireless device 102. Device identifications 14 may include, but are not limited to, a mobile subscriber integrated services digital network number (MSISDN), a subscriber identification module (SIM) card for the wireless device, or a telephone number for the wireless device, among other device identifications. Thus, when a caller using wireless device 108 dials the telephone number associated with wireless device 102, voicemail service 106 may access the voicemail account 16 associated with wireless device 102 based upon the telephone number dialed by the caller.

In one aspect, a general outgoing message 18 may be played to callers accessing the voicemail account 16. A general outgoing message 18 may include, for example, a message the subscriber leaves to be heard by callers if the subscriber does not answer a call. Wireless device 102 may receive inputs from the user and/or other wireless device and server components with the general outgoing message 18. For example, wireless device 102 may receive inputs from other wireless device and server components, such as, but not limited to, a memory or database, a clock, a position location module, a camera, a microphone, a wired or wireless communication interface, a keypad, or a touch sensitive display, among others sources of inputs.

Figure 2:
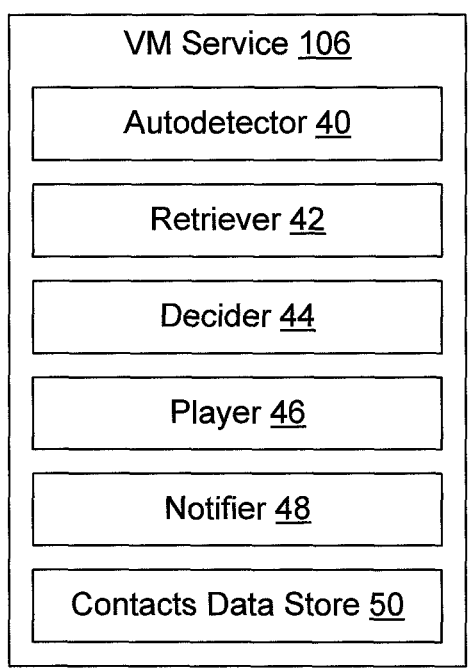
FIG. 2 is an illustration of an example voicemail service in accordance with an aspect.

Voicemail account 16 may also store customized outgoing messages 20 for one or more contacts associated with the subscriber. Contacts may include, but are not limited to, friends, family, co-workers, social network friends, physicians, places of business, or a telephone number and/or name selected by the subscriber, among other contacts. In addition, the contacts may be associated with a contact identification (ID) 22 which uniquely identifies the one or more contacts. The contacts IDs 22 may be stored in a contacts data store 50 (FIG. 2) along with additional contact information on the voicemail service 106, for example.

Figure 3:
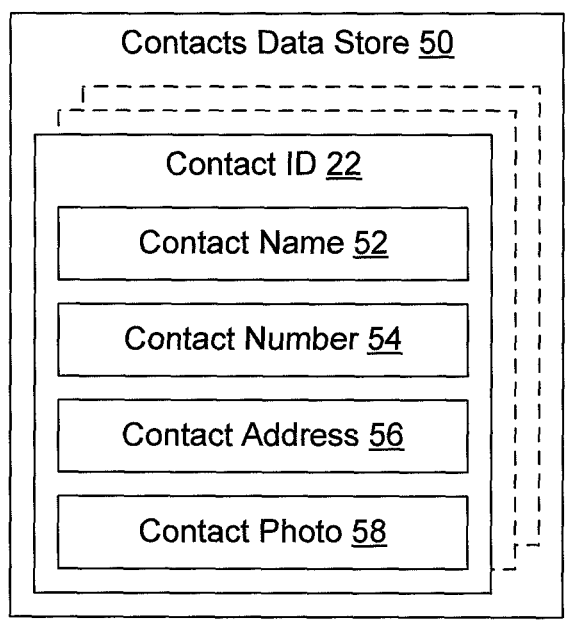
FIG. 3 is an illustration of an example contacts data store in accordance with another aspect.

Additional contact information may include, but is not limited to, the contact names 52, the contact numbers 54, the contact addresses 56, and the contact photos 58, as illustrated in FIG. 3. For example, contacts data store 50 may include one or more contact names 52 and/or contact addresses 56 for individuals and/or businesses listed in the contacts data store 50. The contact addresses 56 may include, but is not limited to, a street address, an e-mail address, a network address, or a social networking site associated with the contact, among other addresses. In addition, contacts data store 50 may include one or more contact numbers 54 and/or contact addresses 56 associated with the one or more contact IDs 22. Thus, it should be appreciated that a contact ID 22 may have one or more contact numbers 54 and/or contact addresses 56 associated with the contact ID 22. Additionally, contact ID 22 may also include a photo 58. The contact's photo 58 may be received from other wireless device and server components, such as, but not limited to, a memory or database, a camera, a wired or wireless communication interface, a keypad, or a touch sensitive display, among others sources of inputs. In addition, the photo 58 may be received from a social network service associated with the subscriber. It should be appreciated that a contact ID 22 may have one or more photos 58 associated with the contact ID 22.

Referring back to FIG. 1, a customized outgoing message 20 may include an individually tailored voicemail message for a specific contact, such as a personal interactive holographic status message (PRIHSM). A holographic voicemail message may be a message that sounds differently when heard by different callers. For example, the subscriber may record PRIHSMs which may be saved as .wav or other similar media files on voicemail service 106 to be played when the specific contacts call the subscriber. Wireless device 102 may receive inputs from the subscriber selecting one or more contacts to receive a customized outgoing message 20. For example, the subscriber may associate a contact with a customized outgoing message saying that the subscriber is getting on a plane now after the flight was delayed. In addition, the customized message 20 may be associated with one or more contact IDs 22. Thus, more than one contact may receive the same customized message 20. To associate a specific contact with a customized outgoing message, a subscriber may provide the contact's name 52 (FIG. 2) and the contact's number 54 (FIG. 2) using an interface, such as a webpage, that collects the information provided by the subscriber and saves same in a database for future reference. For example, the user may select a group of co-workers from the subscriber's contacts to receive a customized outgoing message saying that the user is in a meeting until later that day, while the remaining callers will receive the subscriber's general outgoing message and/or a different customized message for a specific caller.

Voicemail client 10 may be operable to receive an outgoing message from a user and communicate the user's outgoing messages to the voicemail account 16. For example, voicemail client 10 may prompt the user to select a general outgoing message 18 or a customized message 20 for one or more contacts. In an aspect, voicemail client 10 may use an interface, such as a web interface, to aid the user in registering for voicemail services and/or recording an outgoing voicemail message. The interface may include menus with one or more selections that the user may choose for customizing and/or personalizing the outgoing messages and/or voicemail settings. Menu selections may include, for example, selecting a time period during which an outgoing message should be played, and selecting one or more contacts that should receive a customized outgoing message, among other menu selections. It should be appreciated that the interface may be on wireless device 102 or another computing device that the user may access. In another aspect, voicemail client 10 may use the phone system with menu options for customizing and/or personalizing outgoing messages and/or voicemail settings.

Voicemail client 10 may also receive one or more messages 34 left for the subscriber using the voicemail service 106. The one or more messages 34 may include a message ID 32 and may be stored in a messages data store 30 on voicemail service 106. The subscriber may access the messages 34 by using the message ID 32.

In addition, voicemail client 10 may provide social network information to voicemail service 106 for the one or more social networking services 110 associated with wireless device 102. Social networking services 110 may include, but are not limited to, social networking sites. Social network information may include, for example, the names of the social network services 110 associated with wireless device 102, authentication information 26, such as a username and/or passwords, for accessing the social networking services 110, session information 28 for communication sessions already established between wireless device 102 and the social network services 110, and contact information for contacts listed on the social network services 110, among other social network information.

For example, voicemail client 10 may communicate with one or more social network clients 12 on wireless device 102 to determine the one or more social network services 110 associated with a user of wireless device 102. The social network clients 12 may be used to establish communication sessions with the social networks 110. In an aspect, the social network clients 12 may send authentication information 26 (e.g., usernames and/or passwords) to the social network services 110 to establish one or more communication sessions 28 with wireless device 102. It should be appreciated that the communication sessions 28 with the social network services 110 may be maintained for the duration of the user's login session, e.g., a proxy session will be maintained with the social network services 110 for the duration of the user's login session. Wireless device 102 may have communication sessions 28 with more than one social network services 110 at the same time. In addition, the social network clients 12 may also send the social network information to the voicemail client 10 which may forward the social network information.

Voicemail service 106 may have one or more social network identifications (IDs) 24 identifying the social network services associated with wireless device 102. In addition, the social network IDs 24 may include the authentication information 26 and/or the session information 28 for the social network services 110 associated with wireless device 102. Thus, voicemail service 106 may use the authentication information 26 and/or session information 28 provided by the voicemail client 10 to access the social network services 110 associated with wireless device 102.

In an aspect, voicemail service 106 may use an autodetector component 40 (FIG. 2) to determine whether the one or more social network services 110 have updated information, such as a new status message 36, a new post 38, a new picture and/or photograph, or new contacts, among other updated information. Status messages 36 and/or posts 38 may include, for example, messages that reflect a subscribers' latest activity. If there is updated information on the social network services 110, voicemail service 106 may use a retriever component 42 (FIG. 2) to pull the information from the social network services 110 for use by the voicemail service 106. The retriever component 42 may be further operable to retrieve messages 30 left for the subscriber on the voicemail service 106. The autodetector component 40 and retriever component 42 may communicate with the one or more social network IDs 24 to access the social network services 110 using the authentication information 26 and/or session information 28.

Voicemail service 106 may also have a decider component 44 (FIG. 2) which communicates with the retriever component 42 and determines the format of the information retrieved by the retriever component 42. For example, the decider component 44 may determine if the received information is in a text format and/or an audio format. In addition, the decider component 44 may be further operable to convert the received information into a different format. For example, the decider component 44 may convert text information into an audio format, such as a .wav file using, for example, a text to speech converter. In addition, the decider component 44 may convert the audio information into a text format. Thus, the decider component 44 may be used to alter the format of the received information in order to make it easier to either play the received information and/or display the received information in text format.

Voicemail service 106 may further include a player component 46 (FIG. 2) operable to play messages and/or additional information received from the social network services 110. The player component 46 may communicate with the retriever component 42 and the decider component 44 to play the received messages 30 for the subscriber, the general outgoing message 18 for callers, customized messages 20 to callers, and any additional information received from the social network services 110, for example.

In addition, the voicemail service 106 may include a notifier component 48 (FIG. 2) operable to notify the user of new messages 32 and/or new information from social network services 110. For example, the notifier component 48 may communicate with the autodetector component 40 to receive new status updates 36 and/or new posts 38 detected from social network services 110. In addition, the notifier component 48 may communicate with the received messages data store 30 and notify the user when a new message 34 arrives for the user.

While the above voicemail services have been described using a voicemail account on a voicemail service, such as a server, it should be appreciated that the voicemail services may be implemented on the wireless device. It should also be appreciated that the voicemail services may be implemented on the social network services.

Figure 4:
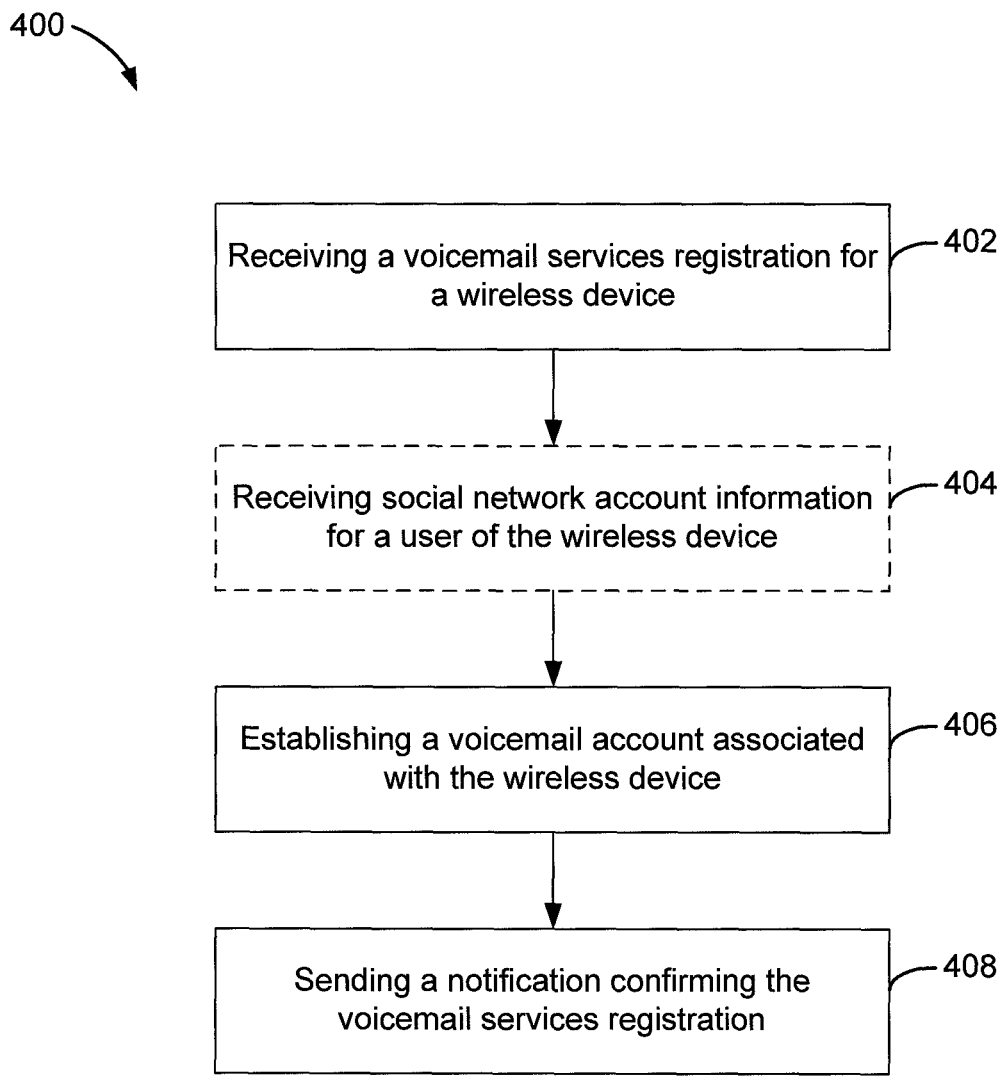
FIG. 4 is a flow chart illustrating a method for registering with a voicemail service in accordance with yet another aspect.

Referring now to FIG. 4, a method 400 for registering with a voicemail service in accordance with an aspect includes, at 402, receiving a voicemail services registration for a wireless device. For example, a subscriber to the voicemail services may register the wireless device with the voicemail services by providing information about the wireless device, e.g., the device ID, and subscriber information to the voicemail services. In an aspect, a webpage on the wireless device and/or a computing device may be used to collect the registration information and forward the information to the voicemail service. In another aspect, the registration information may be collected via a phone system with menu options for voicemail settings.

The method may optionally include, at 404, receiving social network account information for a subscriber of the voicemail services. For example, the subscriber may provide usernames and/or passwords to one or more subscriber accounts on social networking sites. In addition, the wireless device may provide information for one or more communication sessions established between the wireless device and the social networking sites.

Next, at 406, the method may include establishing a voicemail account associated with the wireless device based upon the information received during the registration process, and at 408, the method may include sending a notification to the subscriber confirming the voicemail registration with the destination identification (DID) for the voicemail services. The notification confirming the voicemail registration may include, but is not limited to, an e-mail message, a short message server (SMS) message, and a multimedia messaging service (MMS) message. In an aspect, the DID may include a code (e.g., an account number, a telephone number, a user name and/or password, a sequence of keys to be pressed) for accessing the voicemail service account associated with the subscriber. In one aspect, the subscriber may receive an SMS message that includes a telephone number for accessing the voicemail messages left for the subscriber on the voicemail services.

For example, the subscriber may receive an SMS that reads, "Thank you for signing up for our voicemail services! Click here to forward calls. *73 1257111222." The provided phone number may be the DID associated with the server that stores the voicemail or it may be associated with a server that does not store the voicemail but has means of accessing the voicemail on a different server. Thus, the subscriber may dial this allocated number to check his messages from the server. In addition, the subscriber may use another access mechanism, such as a webpage interface, to check the voicemail account. In a case where the subscribers' voicemail is located on a different server than the one which the provided DID is designated for, the subscribers' voicemail may be retrieved by the server via http calls, without detracting from the user experience.

Figure 5:
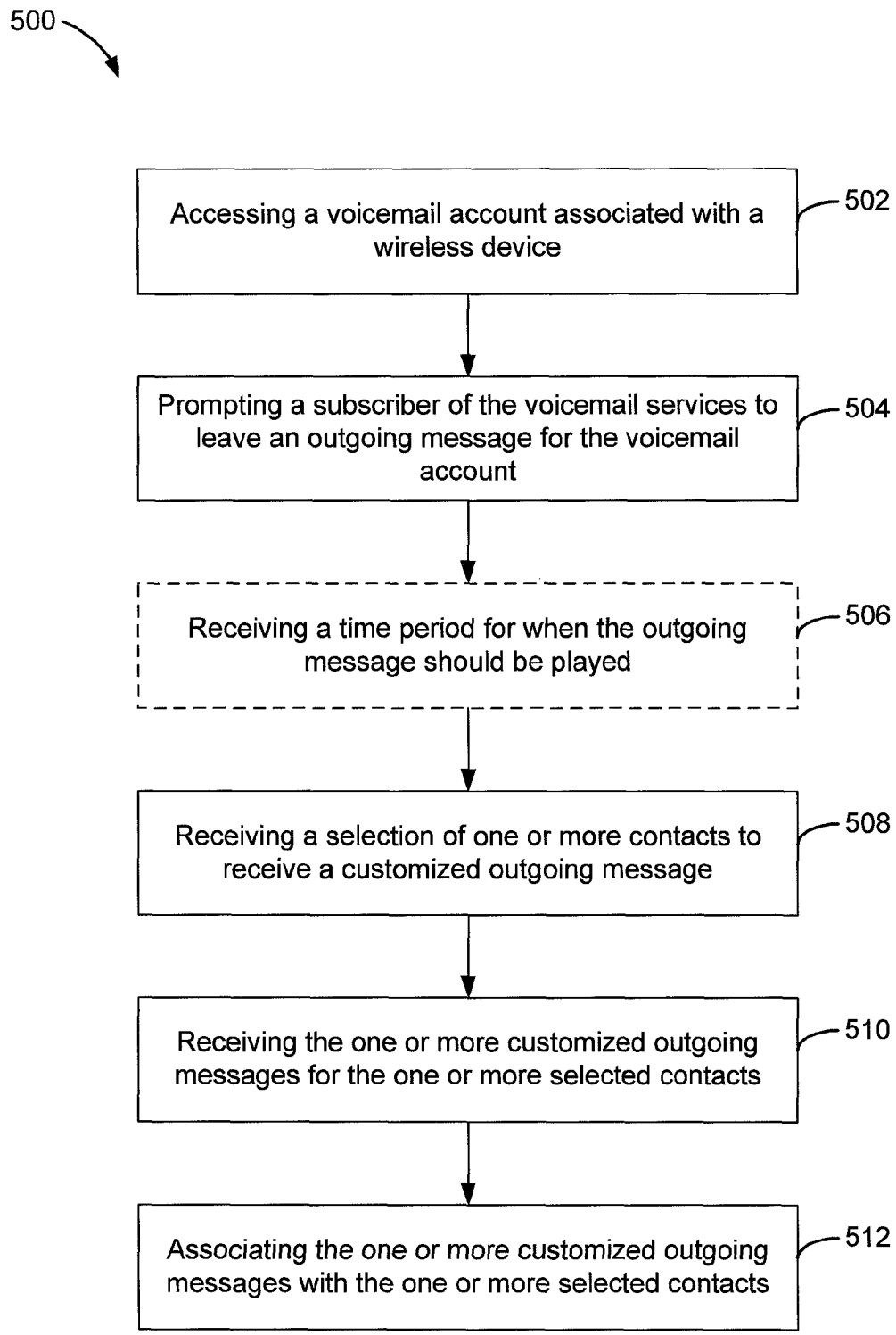
FIG. 5 is a flow chart illustrating a method for providing an outgoing message to the voicemail service in accordance with an aspect.

Referring now to FIG. 5, a method 500 for providing an outgoing message to the voicemail service in accordance with an aspect includes, at 502, accessing a voicemail account associated with a wireless device. For example, the subscriber may use the destination address provided from the notification (408) to access the subscriber's voicemail account. In another aspect, the voicemail account may be accessed based upon the identification of the wireless device.

Next, at 504, the method may include prompting a subscriber of the voicemail service to leave an outgoing message for the voicemail account. For example, the subscriber may leave a general outgoing message for the voicemail account and/or one or more customized outgoing messages for the voicemail account.

At 506, the method may optionally include receiving a time period during which the outgoing message should be played. The subscriber of the voicemail service may set an outgoing message to expire after a period time such that the outgoing message may be replaced automatically with a general outgoing message and/or another customized message after expiration of the period of time. In an aspect, the voicemail service may access a clock and/or calendar function on the voicemail service and/or wireless device to determine the time frame for when the outgoing message should be played. For example, the subscriber may set an outgoing message to indicate that the subscriber is in a meeting until 3:00 p.m. on a particular day and the voicemail message service may use the clock and/or calendar functions to set the outgoing message to expire after the subscriber's meeting ends.

Setting a time period for when the outgoing message should be played may eliminate the need for the subscriber to update outgoing messages when they become outdated. In addition, the outgoing messages may be set to be automatically recurring and/or time sensitive, such as messages set to play on weekends and/or messages created for different times of the day, such as in the morning, at lunch, or in the evening. It should be appreciated that the subscriber may have more than one outgoing message associated with a period of time for when the outgoing message should be played.

At 508, the method may further include receiving a selection of one or more contacts to receive a customized outgoing message, e.g., an individually tailored message a specific contact would receive upon reaching the subscriber's voicemail account. The contacts may be selected from, for example, a contacts data store on the voicemail service account, a contacts data store on the wireless device, and/or a contact data store from the one or more social networking sites associated with the voicemail account, among other contact data stores. In an aspect, the voicemail service may include an interface, such as a webpage, with a menu which allows the subscriber to select how to access the contact information. For example, the subscriber may select an option for social contacts, e.g., contacts from the social networking sites. Thus, the voicemail service may access the one or more social networking sites associated with the voicemail account using the information provided during the registration process (402) and may retrieve the subscriber's contacts from the social networking site. It should be appreciated that the selection of contacts to receive a customized message may also occur during the registration for the voicemail services (402).

In addition, the customized messages may be associated with one or more contacts. Thus, more than one contact may receive the same customized message. For example, the user may select a group of co-workers from the user's contacts to receive a customized outgoing message saying that the user is in a meeting until later that day, while the remaining callers will receive the user's general outgoing message and/or a different customized message for the specific caller.

At 510, the method may include receiving the one or more customized messages for the one or more selected contacts. The voicemail service may receive and store the subscriber's customized messages for the selected contacts.

Next, at 512, the method may further include associating the one or more customized messages with the one or more selected contacts. The voicemail service may receive contact names and/or numbers to associate with the customized message. For example, the subscriber may provide a contact name and the contact's phone number in an interface, such as a webpage and associate the contact's name and/or telephone number with the customized message. In another aspect, the subscriber may use the phone system with menu options for voicemail settings to create the association between the contact and the customized message. The association between the contact and the customized message may occur after the subscriber hears a voice message left by the contact for the subscriber. For example, the subscriber may be prompted by the telephone system to create an association with the contact and a customized message.

Figure 6:
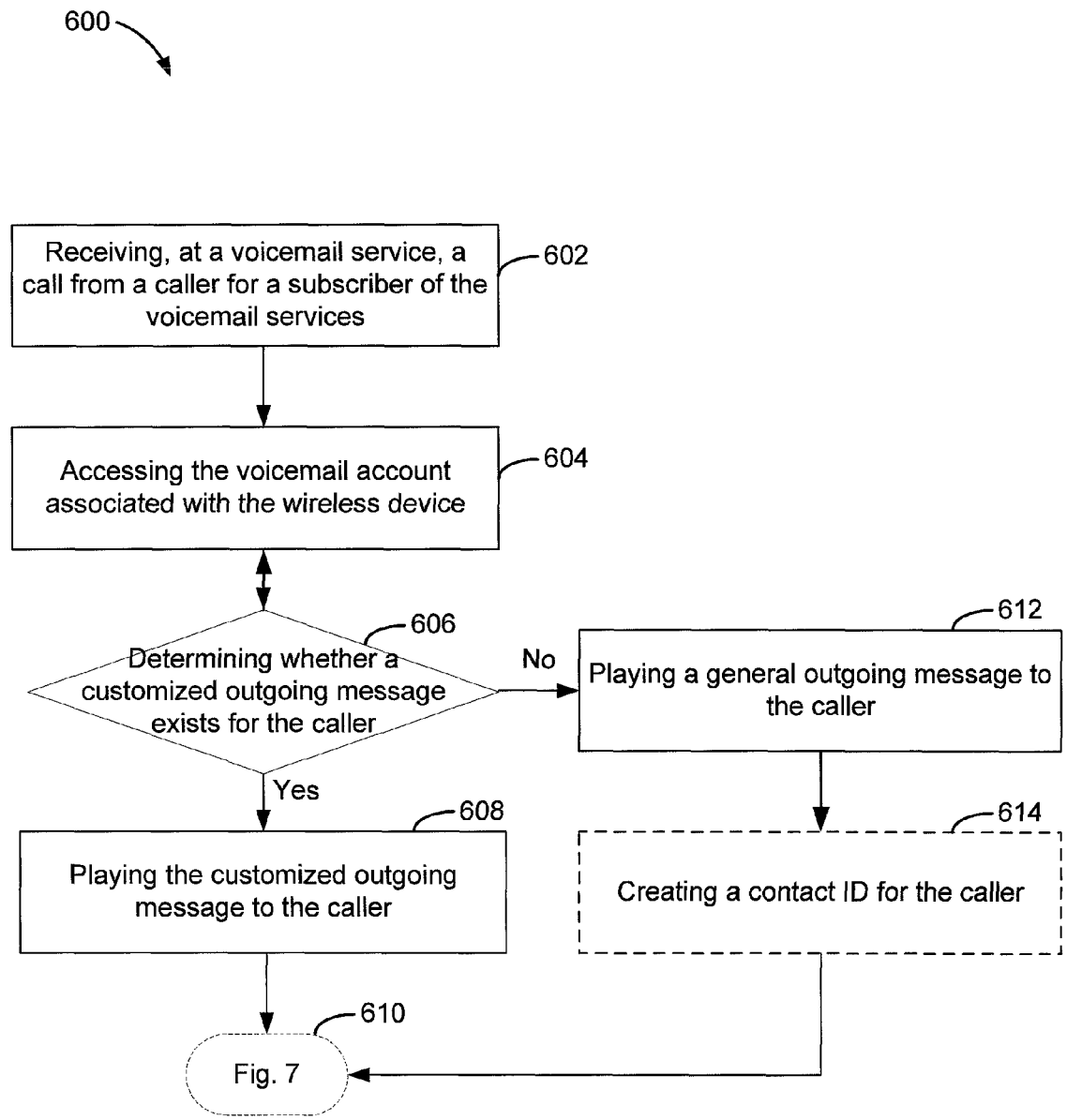
FIG. 6 is a flow chart illustrating a method for receiving an outgoing message in accordance with another aspect.

Referring now to FIG. 6, a method 600 for receiving an outgoing message in accordance with another aspect includes, at 602, receiving, at a voicemail service, a call from a caller for a subscriber of the voicemail services. For example, if the caller dials the telephone number for the wireless device and the line is busy and/or the user of the wireless device does not accept the call, then the call may be forwarded to the voicemail service account associated with the user of the wireless device. In an aspect, the voicemail service may be a server, such as an Asterisk server, to handle the incoming calls and/or store audio files, such as .wav files, of subscriber recorded messages, such as general and/or customized outgoing messages for callers trying to contact the subscriber of the wireless device Next, at 604, the method may include accessing the voicemail account associated with the wireless device. The voicemail service may use the telephone number dialed by the caller to access the subscriber's voicemail account associated with the telephone number of the wireless device.

At 606, the method may include determining whether a customized outgoing message exists for the caller. The voicemail service may compare the incoming contact information for the caller (e.g., the telephone number associated with the caller, the name of the caller, and/or the photo of the caller) with the customized outgoing message in the voicemail account and determine whether a customized message is associated with the caller. If a customized outgoing message is not associated with the caller, at 612, the method may include playing a general outgoing message for the caller.

If a customized outgoing message is associated with the caller, at 608, the method may include playing the customized outgoing message to the caller. For example, the customized outgoing message may tell the caller that the subscriber's plane is late and that the subscriber will miss an appointment with the caller.

The method may optionally include, at 614, creating a contact ID for the caller. For example, if the caller is not a contact stored the subscriber's contact data store, the subscriber may create a contact ID and associate the caller's telephone number with the contact ID to store the caller's information for future reference. In addition, the subscriber may update the contact ID for the caller. For example, if the subscriber did not previously have the contact's telephone number, the subscriber may associate the contact's telephone number with the contact ID. By associating a contact, such as a social networking contact, with a telephone number, the voicemail server may be able to retrieve a recent photograph of the contact from the social networking account. Thus, the next time the contact calls the subscriber, the contact's recent photograph may be displayed on the subscriber's telephone display.

For example, a subscriber is friends on a social networking site "A" with a contact but the subscriber does not know the contact's phone number. This morning, the contact called the subscriber and left a voicemail message on the subscriber's voicemail account. The subscriber may have access to the contact's phone number, based on the caller ID of the contact and the voicemail message which may include the contact's telephone number. The subscriber can associate the user's social networking contact with the telephone phone number retrieved from the contact's voicemail message. Thus, the next time the contact calls the subscriber, the contact's name may come up on the subscriber's wireless device along with a recent picture of the contact from the contact's account on the social networking site "A." Alternatively, the subscriber may also associate the contact with a PRIHSM via a phone menu after listening to her voicemail by phone.

At 610, the method may further include playing a status message from a social networking account along with the outgoing message as discussed below in FIG. 7.

Figure 7:
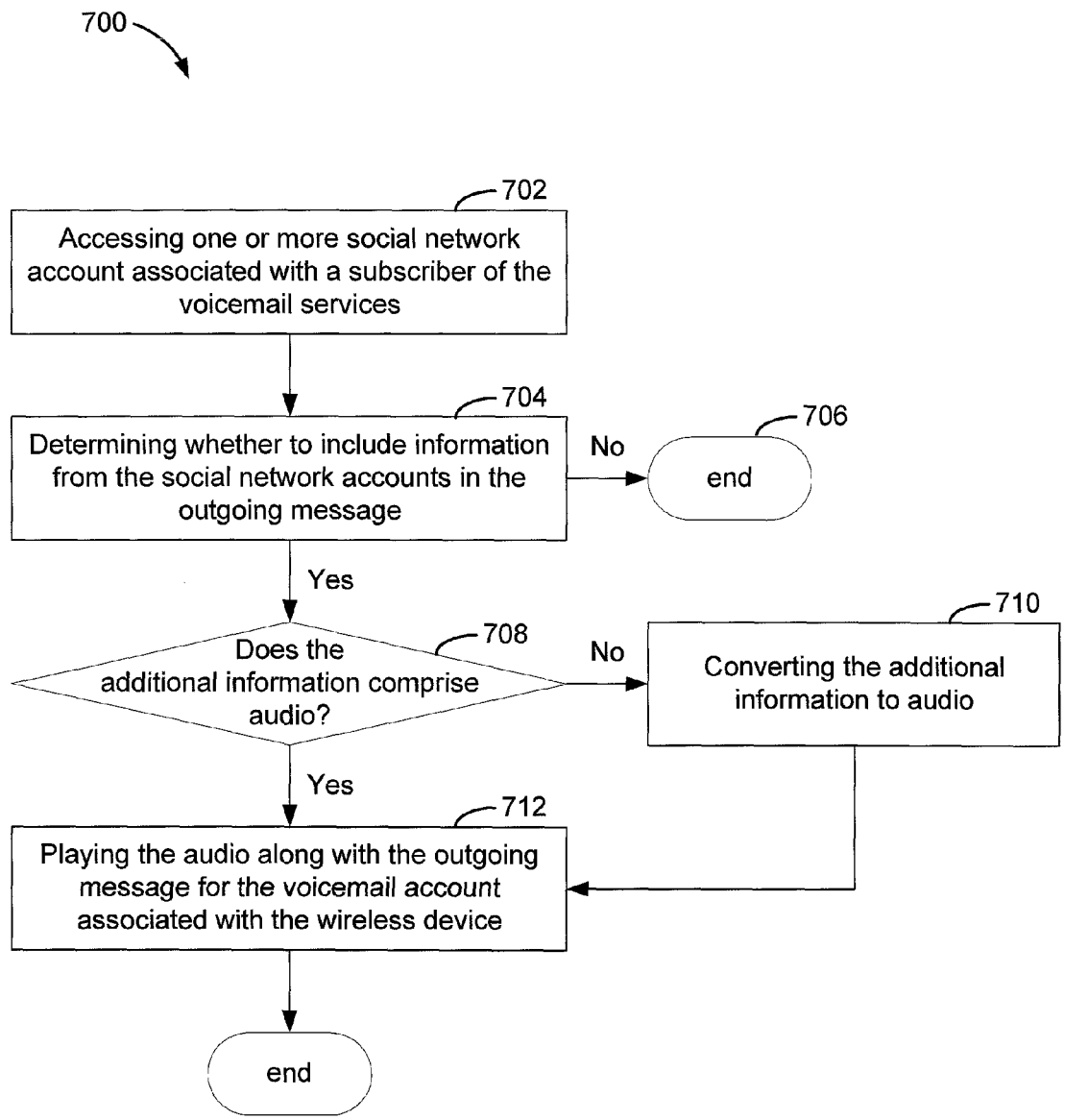
FIG. 7 is a flow chart illustrating a method for playing a status message from a social network account in the outgoing message in accordance with still another aspect.

Referring now to FIG. 7, a method 700 for playing a status message from a social network account with the outgoing message in accordance with an aspect includes, at 702, accessing one or more social network accounts associated with the subscriber of the voicemail services. In an aspect, the voicemail service may use the social network information provided by the wireless device during the registration process, e.g., the social network authentication information and/or session information, to access the one or more social networking sites associated with the wireless device.

Next, at 704, the method may include determining whether to include information from the social network account in the outgoing message. Additional information may include, but is not limited to, a status update, a post, and a new message. The voicemail services may retrieve the additional information from the social networking sites and determine whether to include the additional information in the outgoing message. It should be appreciated that the voicemail service may perform this detection prior to playing the outgoing message to the caller. In addition, the subscriber may select an option to include the additional information from the social networking sites with the outgoing message. If additional information is not included in the outgoing message, at 706, the method may end.

If additional information is included in the outgoing message, at 708, the method may include determining whether the additional information comprises audio. For example, the additional information may have an audio link. The voicemail service may include an autodetector that detects whether the link is an audio file, such as a .wav file. For example, the subscribers' status on social networking "A" may contain a link to a .wav file. If the autodetector cannot determine whether the file contains audio, the voicemail service may include a retriever that retrieves the content link, or at least the header of the link, from the social networking site and a decider component to determine whether the content contains audio.

If the additional information does not comprise audio, at 710, the information may include converting the information to audio. For example, the voicemail service may convert the text of the information into audio format using a text-to-speech engine.

If the additional information does comprise audio and/or if the information is converted into audio, at 712, the method may include playing the audio along with the outgoing message for the voicemail account associated with the wireless device. The voicemail services may include a retriever to retrieve the link and a player component to play the subscriber's outgoing message along with the additional information retrieved from the social networking sites. For example, the player component may play the outgoing message along with a status update retrieved from the social networking site. In addition, the subscriber may also select an ear-candy tone to play with the outgoing messages and status updates.

The voicemail service may periodically check the social networking sites to determine whether an update to information has occurred on the one or more social networking sites and update the outgoing message accordingly.

Figure 8:
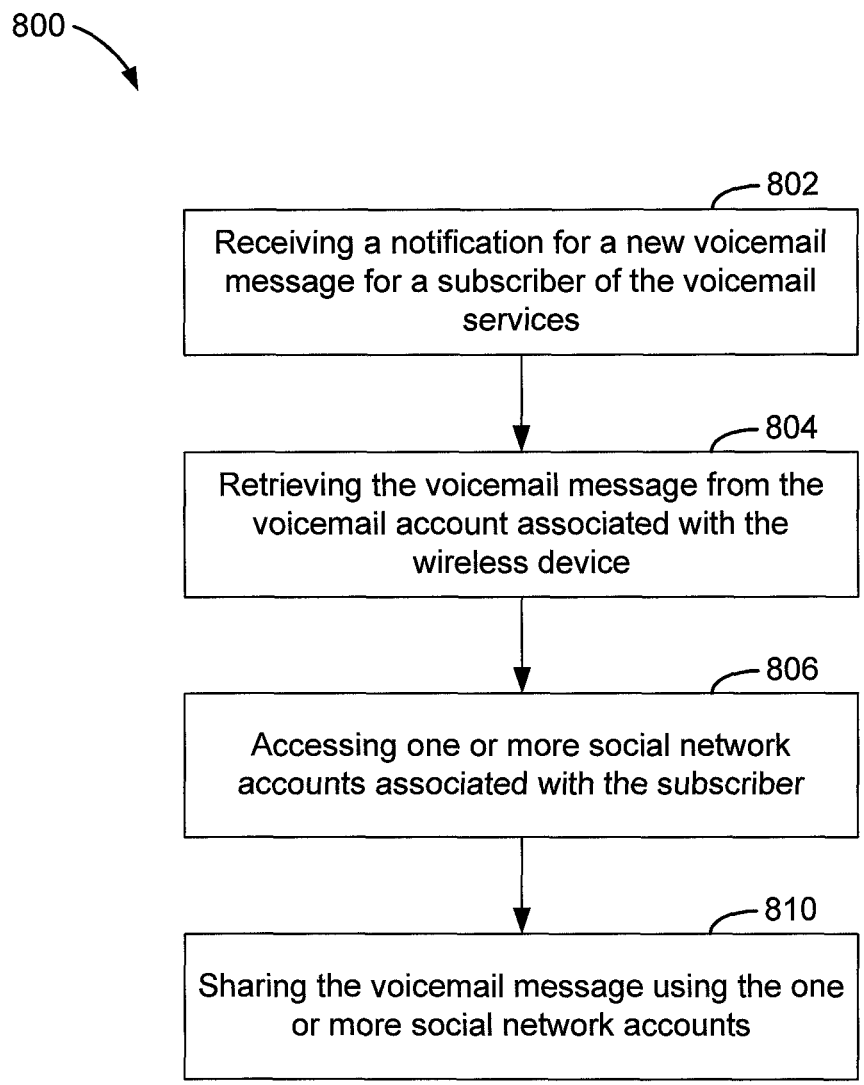
FIG. 8 is a flow chart illustrating a method for sharing a voicemail message with one or more social networking accounts in accordance with another aspect.

Referring now to FIG. 8, a method 800 for sharing a voicemail message with one or more social networking accounts in accordance with an aspect, includes at 802, receiving a notification for a new voicemail message for a subscriber of the voicemail services. The voicemail notification may include, but is not limited to, an e-mail, an SMS message, a MMS message, a really simple syndication (RSS) feed, an icon, an audio tone, and a message via the one or more social media networks, among other forms of voicemail notification. It should be appreciated that the subscriber may select the method for the voicemail notification during the registration process of the voicemail services (402).

At 804, the method may include retrieving the voicemail message from the voicemail account associated with the wireless device. For example, the subscriber may dial the telephone number associated with the subscriber's voicemail account to retrieve the voicemail message.

Next, at 806, the method may include accessing one or more social network accounts associated with the subscriber. As discussed above in reference to FIG. 7, at 702, the voicemail service may use the social network information provided by the wireless device during the registration process, e.g., the social network authentication information and/or session information, to access the one or more social networking sites associated with the wireless device.

Referring again to FIG. 8, at 810, the method may further include sharing the voicemail message using the one or more social networking accounts. Sharing the voicemail message may include, but is not limited to, uploading the voicemail message to subscriber's social networking site and posting a link to the voicemail message on the user's social networking site.

For example, the voicemail message may be uploaded to a social networking site in the form of a link transferred to a third-party server. If a subscriber wishes to upload a voicemail message to a social networking site, the link may be copied to a second messaging server and may be accessed from this second server. This can prevent a link from being broken by the subscriber trying to delete the link after it is posted. If the subscriber wishes to delete a link, such as a voicemail message link, after it has been posted on a social networking site, the subscriber may do so by accessing a web interface that would allow the deletion of the copied link.

If a subscriber, after viewing and/or listening to the voicemail messages, wishes to delete a message, the message may be deleted in the database which may be hosted on a database server, and the .wav file for that message may also be deleted from the location where the .wav file is hosted, which in one example, may be on an asterisk server, via an HTTP call.

In an aspect, the subscriber may select an option to share the voicemail message on one or more social networking sites by pressing an option on the wireless device. For example, the subscriber may check for voicemail messages via a phone and/or a wireless phone by dialing in to the voicemail server and hearing the subscriber's messages. The subscriber may choose from various options, upon hearing a new voicemail message, including choosing to upload a voicemail message to the subscriber's social networking status, such as the user's status on social networking site "A", by pressing a number option on the phone, via DTMF ring, as is known in the art.

In another aspect, the subscriber may use an interface, such as a webpage to select the option of sharing the voicemail message on one or more social networking sites. It should be appreciated that the web interface may be on the wireless device and/or another computing device that the subscriber can access.

In another aspect, the subscriber may record a voicemail message that the subscriber wants to share on the subscriber's social networking accounts. Thus, instead of sharing a voice message received from a caller, the subscriber may use the voicemail services to share a voice message recorded by the subscriber.

Figure 9:
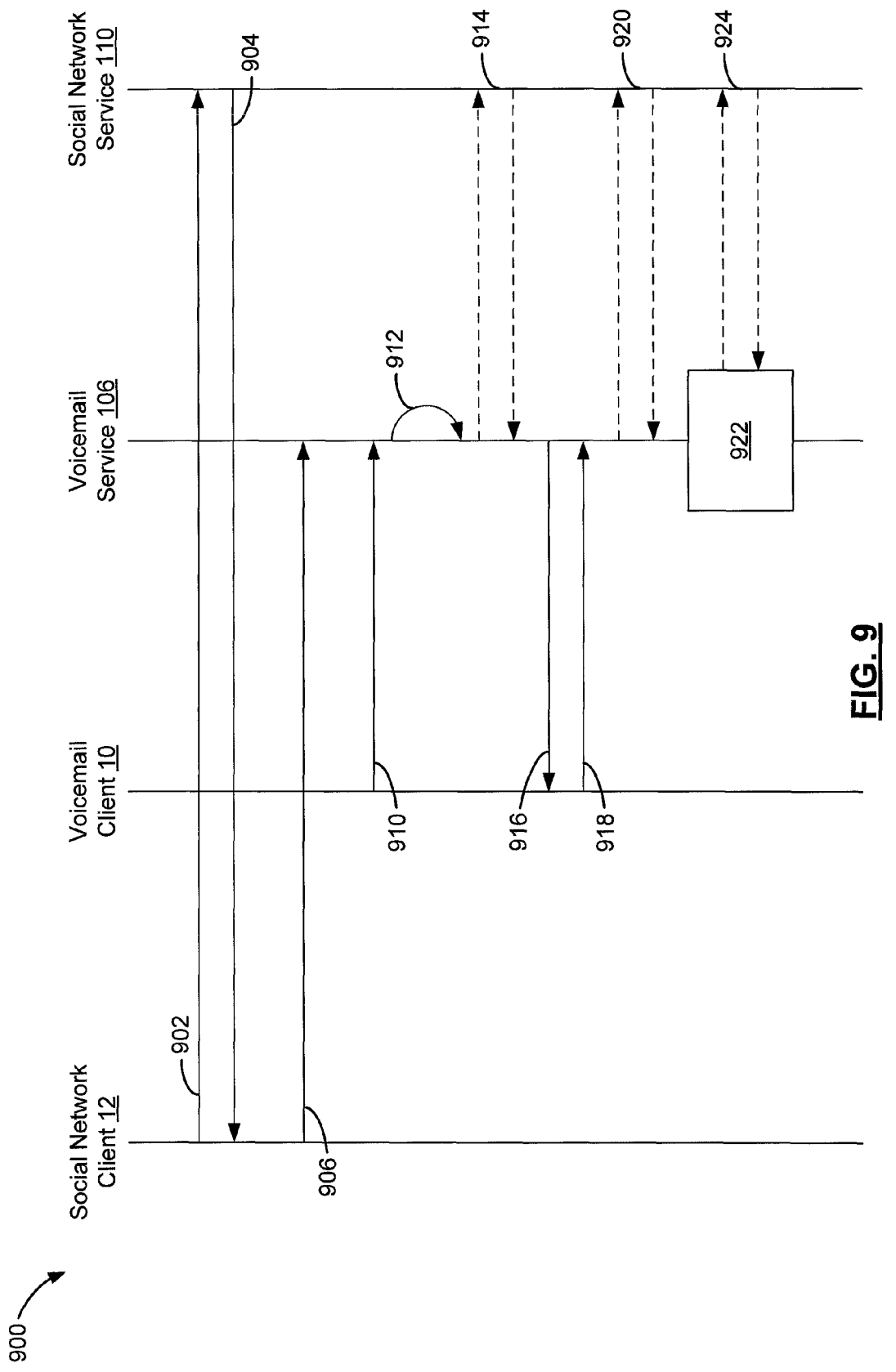
FIG. 9 is an illustration of an example methodology that facilitates voicemail services in accordance with another aspect.

Referring now to FIG. 9, illustrated is an example methodology 900 of voicemail services, as discussed above in reference to FIGS. 4-8. At 902, social network client 12 may establish an initial connection with social network service 110. During the initial connection, social network client 12 may provide authentication parameters, such as a user name and/or password, for establishing a session with the social network service 110. At 904, a session may be established between the social network service 110 and the social network client 12. The session may be maintained between the social network client 12 and the social network service 110 for the duration of the user's login into the social network service 110. At 906, the social network client 12 may provide social network information to the voicemail service 106. The social network information may include, but is not limited to, the authentication information (e.g., user name and/or passwords) for the social network service 110 and the session information for the social network service 110. The voicemail service 106 may use the social networking information to access the social network service 110.

At 910, the voicemail client 10 may call the voicemail service 106 to leave an outgoing message for the subscriber of the voicemail service 106. Next, at 914, the voicemail service 106 may determine whether a customized outgoing message should be recorded. The outgoing message may be customized for a particular contact to receive the message. In addition, the outgoing message may be customized based upon the time during which the message should be played, e.g., at night or on the weekends. At 912, the voicemail service 106 may access the social network service 110 to obtain additional information regarding the contacts for the subscriber of the voicemail services. For example, voicemail service 106 may access additional contacts for the subscriber of the voicemail service 106 and/or additional contact information, such as names and/or telephone numbers.

At 916, the voicemail service 106 may send the additional contact information and/or message customization information to the voicemail client 10. At 918, the voicemail client 10 may forward the one or more outgoing messages to the voicemail service 106. At 920, the voicemail service 106 may access the social network service 110 using the social network information to determine whether additional information from the social network service 110 should be added to the outgoing message. Additional information may include, for example, an updated status for the subscriber, a new post, among other information. The additional information may be sent to the voicemail service 106 to be played with the outgoing message.

At 922, the voicemail service 106 may receive one or more messages for the subscriber of the voicemail services from callers attempting to reach the subscriber. The subscriber may decide to share the one or more voicemail messages with the social network service 110, and at 924, the voicemail service 106 may access the social network service 110 to share the one or more voicemail messages.

Figure 10:
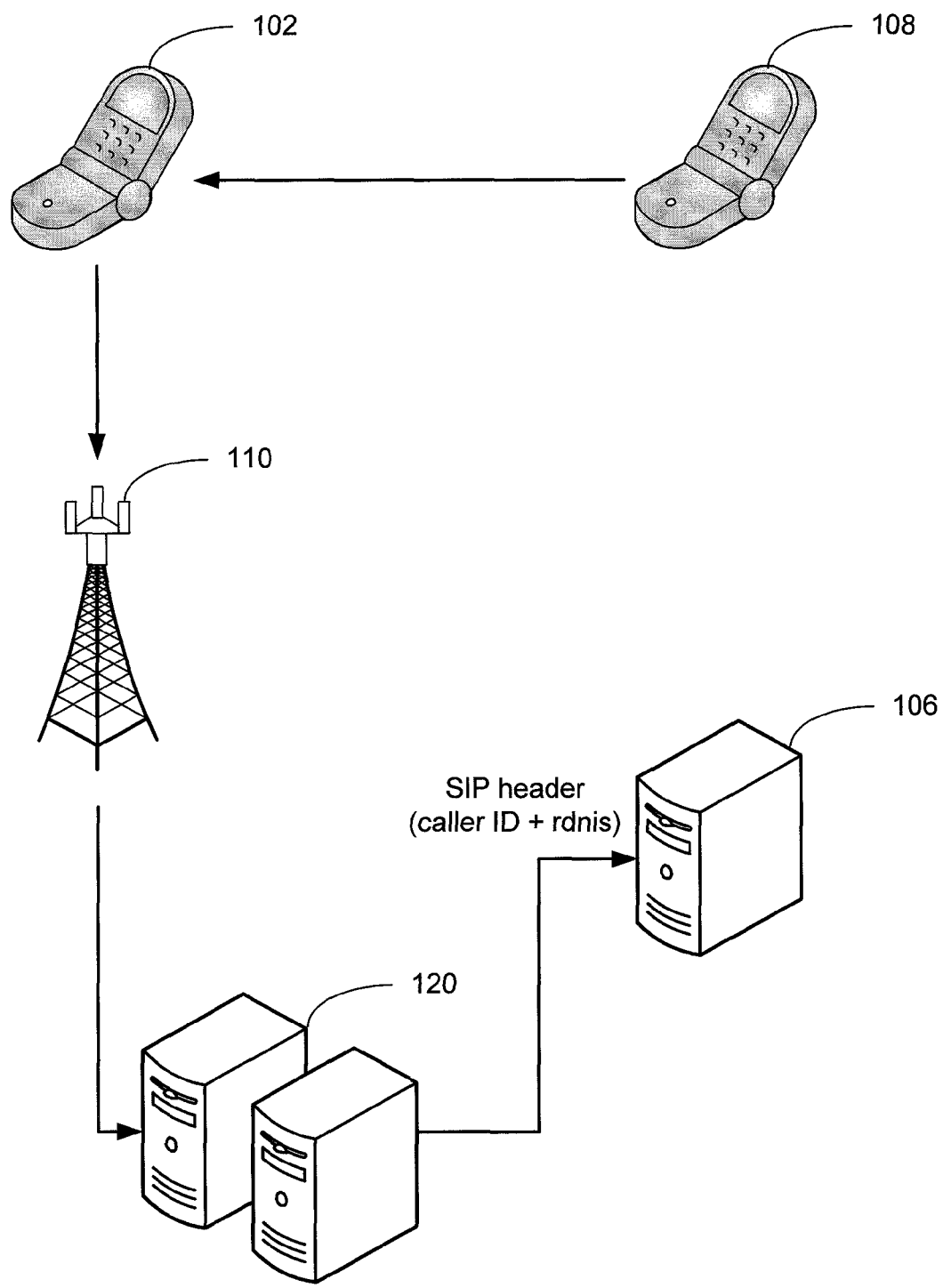
FIG. 10 is an illustration of a connectivity system in accordance with another aspect.

Referring now to FIG. 10, illustrated is an example connectivity system 1000 that includes one or more wireless devices 102 (FIG. 1), 108 (FIG. 1) communicating through one or more cell towers 110 with one or more mobile switching centers 120 and one or more servers and/or computing devices 106 (FIG. 1). In an aspect, when a caller using wireless device 108 attempts to contact a subscriber of the voicemail service, e.g., a user of wireless device 102, the call may be forwarded via a cell tower 110 to a Mobile Switching Center (MSC) 120 and communicated to the messaging server and/or set of servers 106. Servers 106 may include an Asterisk server, for example, to handle incoming calls and store audio files, such as .wav files, of user-recorded messages. In addition, servers 106 may include a web server for registration, user visual interface pages, and/or a database server, among other server components.

When the server(s) 106 receive the call, the SIP header may include the caller's caller ID, e.g., the caller ID from wireless device 108, and the Redirected Dialed Number Information Service (RDNIS) of wireless device 102. A database may compare the caller ID and the RDNIS to locate the voicemail account of the subscriber, and the subscriber's voicemail messages may be played. The voicemail messages may include a personal interactive holographic status message (PRIHSM) which may be comprised of the subscriber's pre-recorded voicemail message plus the subscriber's one or more social networking statuses, for example. The message may also include ear-candy tone, as selected by the user.

Figure 11:
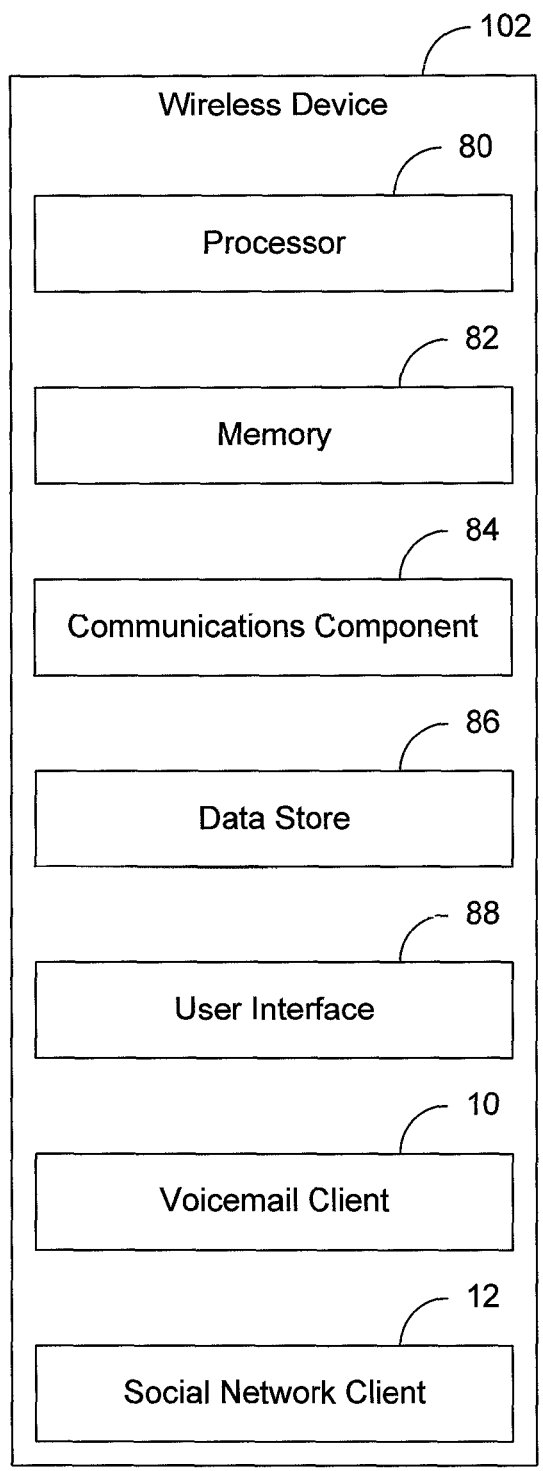
FIG. 11 is an example wireless device operable within the connectivity system in accordance with an aspect.

Referring now to FIG. 11, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further include a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device may also include a voicemail client 10 (FIG. 1) operable for registering and providing voicemail services for use with wireless device 102. Wireless device may further include a social network client 12 (FIG. 1) operable for accessing a social network services associated with the user of wireless device 102.

Figure 12:
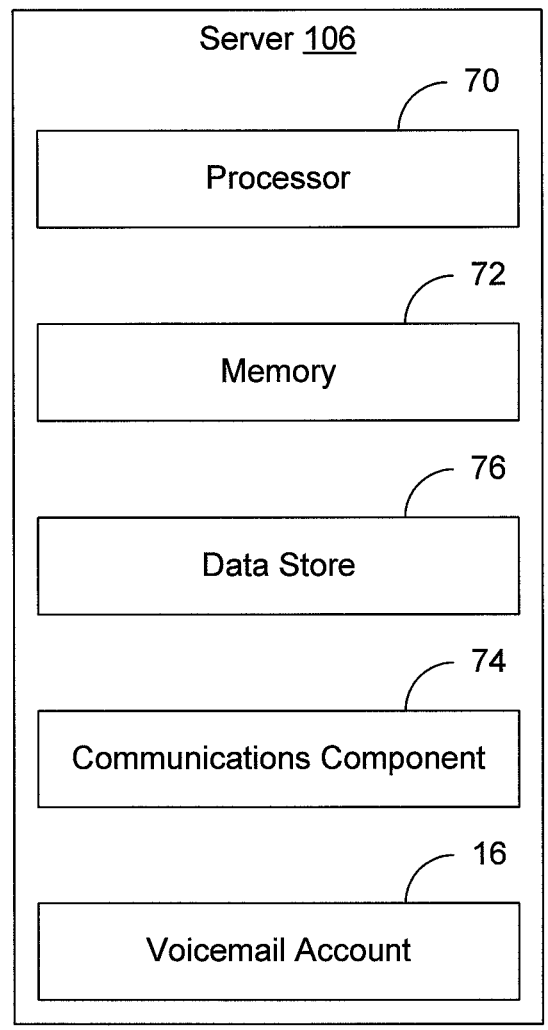
FIG. 12 is an example server device operable within the connectivity system in accordance with yet another aspect.

Referring now to FIG. 12, illustrated is an example server device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processor component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing. Server 106 may also include a voicemail account 16 (FIG. 1) operable for providing voicemail services to a subscriber of the voicemail services.

Figure 13:
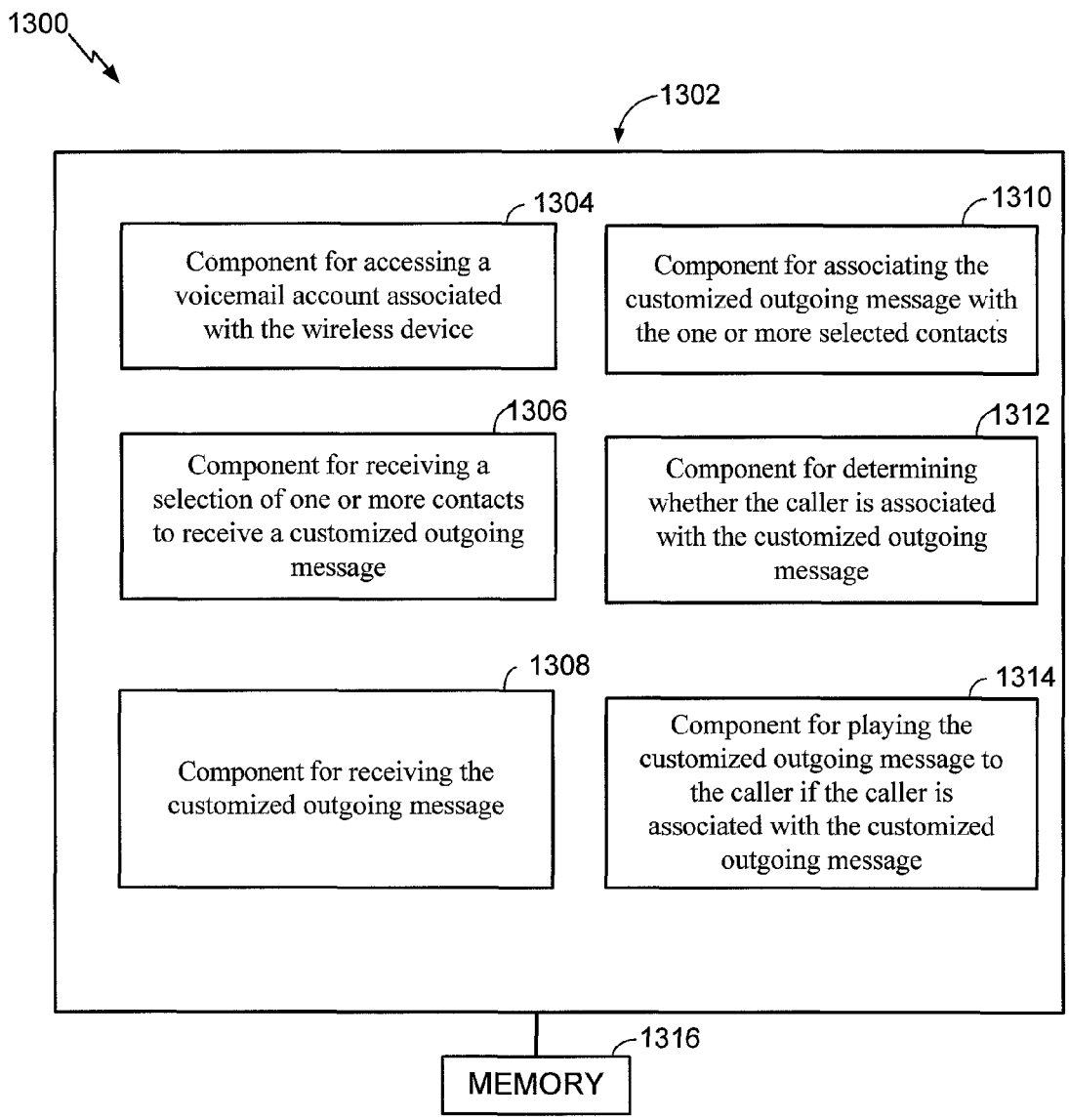
FIG. 13 is an illustration of an example system that facilitates playing a customized outgoing message to a caller calling a wireless device, according to one aspect.

Turning now to FIG. 13, illustrated is a system 1300 configured to present a customized outgoing message to a caller calling a wireless device in accordance with an aspect. For example, system 1300 can reside at least partially within a transmitter, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that facilitate presenting customized outgoing messages. For instance, logical grouping 1302 may include component 1304 for accessing a voicemail account associated with the wireless device. Further, logical grouping 1302 may comprise component 1306 for receiving a selection of one or more contacts to receive the customized outgoing message. In addition, logical grouping 1302 may include component 1308 for receiving the customized outgoing message. Logical grouping 1302 may also include component 1310 for associating the customized outgoing message with the one or more selected contacts. Logical grouping 1302 may further include component 1312 for determining whether the caller is associated with the customized outgoing message. Moreover, logical grouping 1302 may include component 1314 for playing the customized outgoing message to the caller if the caller is associated with the customized outgoing message. Additionally, system 1300 can include a memory 1316 that retains instructions for executing functions associated with electrical components 1304, 1306, 1308, 1310, 1312, and 1314. While shown as being external to memory 1316, it is to be understood that one or more of electrical components 1304, 1306, 1308, 1310, 1312, and 1314 can exist within memory 1016.

Figure 14:
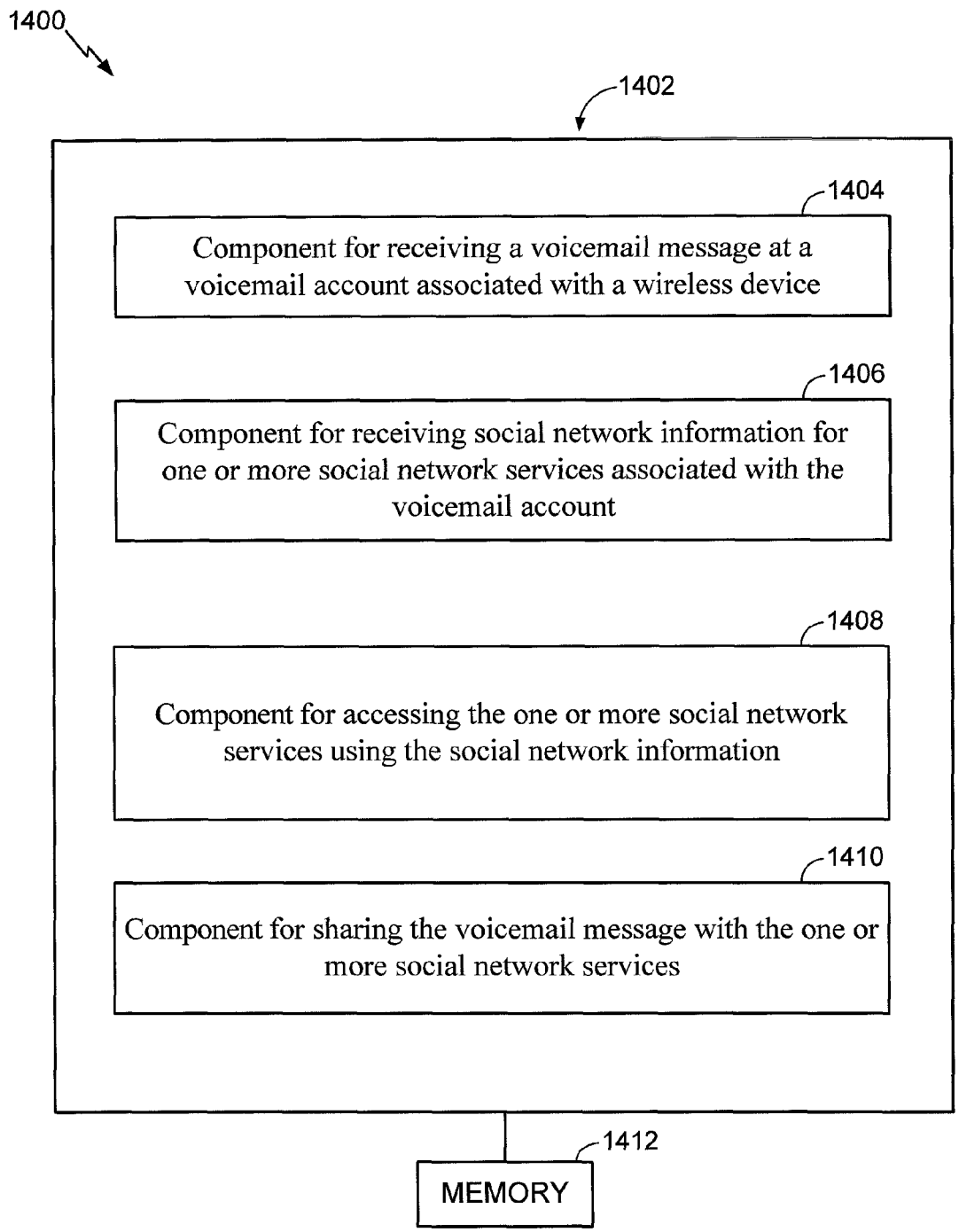
FIG. 14 is an illustration of an example system that facilitates sharing a voicemail message with one or more social networking sites, according to yet another aspect.

Turning now to FIG. 14, illustrated is a system 1400 configured to share voicemail messages with one or more social networking sites in accordance with an aspect. For example, system 1400 can reside at least partially within a transmitter of mobile device, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that facilitate sharing voicemail messages. For instance, logical grouping 1402 may include component 1404 for receiving a voicemail message at a voicemail account associated with a wireless device. Further, logical grouping 1402 may comprise component 1406 for receiving social network information for one or more social network services associated with the voicemail account. In addition, logical grouping 1402 may include component 1408 for accessing the one or more social network services using the social network information. Logical grouping 1402 may also include component 1410 for sharing the voicemail message with the one or more social network services. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
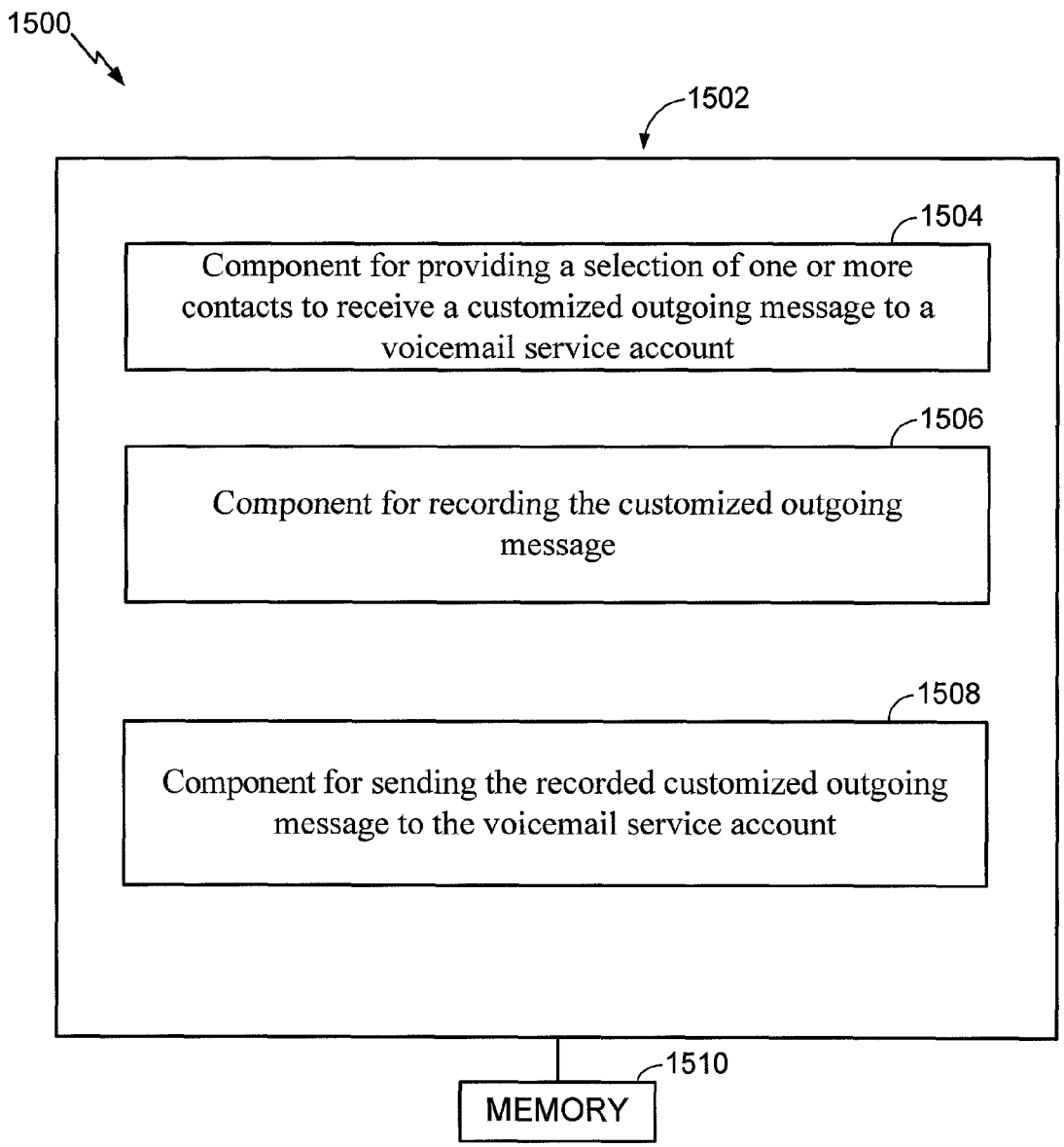
FIG. 15 is an illustration of an example system that facilitates providing a customized outgoing message for a caller calling a wireless device, according to still another aspect.

Turning now to FIG. 15, illustrated is a system 1500 configured to provide a customized outgoing message to a caller calling a wireless device in accordance with an aspect. For example, system 1500 can reside at least partially within a transmitter of a mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that facilitate providing customized outgoing messages. For instance, logical grouping 1502 may include component 1504 for providing a selection of one or more contacts to receive a customized outgoing message to a voicemail service account. Further, logical grouping 1502 may comprise component 1506 for recording the customized outgoing message. In addition, logical grouping 1502 may include component 1508 for sending the recorded customized outgoing message to the voicemail service account. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

One variation of an aspect may include transporting a voicemail message to another subscriber's voicemail account. If caller A leaves a voicemail message for caller B, when caller B calls caller A back without having listened to caller A's voicemail first, caller B will hear A's voicemail message as A's outgoing message. A's voicemail message may be heard instead of and/or in addition to, A's general outgoing message. For example, caller A calls caller B and leaves caller B a voicemail message. Without picking up A's message, caller B then calls caller A back. When the call goes to voicemail, caller B hears the original message caller A left for caller B as caller A's voicemail message, instead of or in addition to caller A's own personal message. This feature could apply to two callers in the same network.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for sharing a voicemail message with one or more social networking sites, the method comprising:
   receiving, at a server, the voicemail message at a voicemail account associated with a wireless device;
   retrieving the voicemail message from the voicemail account;
   receiving social network information for one or more social network services associated with the voicemail account;
   accessing the one or more social network services using the social network information; and
   sharing the retrieved voicemail message with the one or more social network services.

2. The method of claim 1, wherein sharing the voicemail message comprises one of uploading the voicemail message to the one or more social network services, posting a link to the voicemail message on the one or more social network services, or presenting the voicemail message on the one or more social network services.

3. The method of claim 1, wherein receiving the voicemail message further comprises sending a notification to a subscriber of the voicemail account indicating receipt of the voicemail message.

4. The method of claim 3, wherein the notification comprises one of an e-mail message, a short message service (SMS) message, a multimedia messaging service (MMS) message, an icon, or an audio tone.

5. The method of claim 1, wherein retrieving the voicemail message further comprises receiving input from a subscriber selecting the voicemail message.

6. The method of claim 1, wherein the social network information comprises one of authentication information for the one or more social network services or information for a communication session with the one or more social network services.

7. The method of claim 6, wherein the communication session is established between the wireless device and the one or more social network services.

8. The method of claim 6, wherein the authentication information comprises a user name and a password.

9. The method of claim 1, wherein the voicemail message is received from a caller attempting to reach a user of the wireless device.

10. The method of claim 1, wherein the voicemail message is received from a user of the wireless device.

11. At least one processor configured to share a voicemail message with one or more social networking sites, the processor comprising:
    a first module for receiving the voicemail message at a voicemail account associated with a wireless device;
    a second module for retrieving the voicemail message from the voicemail account;
    a third module for receiving social network information for one or more social network services associated with the voicemail account;
    a fourth module for accessing the one or more social network services using the social network information; and
    a fifth module for sharing the retrieved voicemail message with the one or more social network services.

12. A non-transitory computer-readable medium comprising:
    at least one instruction for causing a computer to receive a voicemail message at a voicemail account associated with a wireless device;
    at least one instruction for causing the computer to retrieve the voicemail message from the voicemail account;
    at least one instruction for causing the computer to receive social network information for one or more social network services associated with the voicemail account;
    at least one instruction for causing the computer to access the one or more social network services using the social network information; and
    at least one instruction for causing the computer to share the retrieved voicemail message with the one or more social network services.

13. An apparatus, comprising:
    means for receiving a voicemail message at a voicemail account associated with a wireless device;
    means for retrieving the voicemail message from the voicemail account;
    means for receiving social network information for one or more social network services associated with the voicemail account;
    means for accessing the one or more social network services using the social network information; and means for sharing the retrieved voicemail message with the one or more social network services.

14. An apparatus for sharing a voicemail message with one or more social networking sites, the apparatus comprising:
a voicemail account operable to:
receive the voicemail message for a wireless device;
retrieve the voicemail message from the voicemail account;
receive social network information for one or more social network services associated with the voicemail account;
access the one or more social network services using the social network information; and
share the retrieved voicemail message with the one or more social network services.

15. The apparatus of claim 14, wherein sharing the voicemail message comprises one of uploading the voicemail message to the one or more social network services, posting a link to the voicemail message on the one or more social network services, or presenting the voicemail message on the one or more social network services.

16. The apparatus of claim 14, wherein the voicemail account is further operable to send a notification to a subscriber of the voicemail account indicating receipt of the voicemail message.

17. The apparatus of claim 16, wherein the notification comprises one of an e-mail message, a short message service (SMS) message, a multimedia messaging service (MMS) message, an icon, or an audio tone.

18. The apparatus of claim 14, wherein the voicemail account is further operable to receive input from a subscriber selecting the voicemail message.

19. The apparatus of claim 14, wherein the social network information comprises one of authentication information for the one or more social network services or information for a communication session with the one or more social network services.

20. The apparatus of claim 19, wherein the communication session is established between the wireless device and the one or more social network services.

21. The apparatus of claim 19, wherein the authentication information comprises a user name and a password.

22. The apparatus of claim 14, wherein the voicemail message is received from a caller attempting to reach a user of the wireless device.

23. The apparatus of claim 14, wherein the voicemail message is received from a user of the wireless device.

24. The at least one processor of claim 11, wherein the fifth module is configured to share the voicemail message by uploading the voicemail message to the one or more social network services, posting a link to the voicemail message on the one or more social network services, or presenting the voicemail message on the one or more social network services.

25. The at least one processor of claim 11, wherein the second module is configured to retrieve the voicemail message by receiving input from a subscriber selecting the voicemail message.

26. The at least one processor of claim 11, wherein the social network information comprises one of authentication information for the one or more social network services or information for a communication session with the one or more social network services.

27. The non-transitory computer-readable medium of claim 12, wherein the at least one instruction for causing the computer to share the retrieved voicemail message causes the computer to upload the voicemail message to the one or more social network services, to post a link to the voicemail message on the one or more social network services, or to present the voicemail message on the one or more social network services.

28. The non-transitory computer-readable medium of claim 12, wherein the at least one instruction for causing the computer to retrieve the voicemail message causes the computer to receive input from a subscriber selecting the voicemail message.

29. The apparatus of claim 13, wherein the means for sharing uploads the voicemail message to the one or more social network services, posts a link to the voicemail message on the one or more social network services, or presents the voicemail message on the one or more social network services.

30. The apparatus of claim 13, wherein the means for receiving receives input from a subscriber selecting the voicemail message.

* * * * *